United States Patent [19]
Taylor et al.

[11] 3,819,568
[45] June 25, 1974

[54] NON-LEACHABLE U.V. ABSORBER AND DENTAL RESTORATIVE MATERIAL

[75] Inventors: Charles W. Taylor, East Oakdale Township, Washington County; Robert W. H. Chang, Saint Paul, both of Minn.

[73] Assignee: Minnesota Mining and Manufacturing Company, St. Paul, Minn.

[22] Filed: Nov. 3, 1969

[21] Appl. No.: 873,496

[52] U.S. Cl. ......... 260/42.52, 260/41 A, 260/42.15, 260/42.14, 260/42.53
[51] Int. Cl. ............................................ C08f 45/04
[58] Field of Search ................... 260/41, 45.85, 89.5

[56] References Cited
UNITED STATES PATENTS

| | | | |
|---|---|---|---|
| 3,066,112 | 11/1962 | Bowen | 260/41 |
| 3,445,545 | 5/1969 | Skoultchi | 260/881 |
| 3,541,068 | 11/1970 | Taylor | 260/41 |

*Primary Examiner*—Theodore Morris
*Attorney, Agent, or Firm*—Alexander, Sell, Steldt and DeLaHunt

[57] ABSTRACT

The adduct of glycidyl methacrylate and phenyl salicylate is found to be a valuable copolymerizable and hence non-leachable stabilizer for acrylate monomers against color change induced by ultra-violet light in dental compositions of inorganic particulate material as filler, N,N-bis(hydroxyalkyl)aromatic amine as potential accelerator and acrylate or methacrylate esters of aromatic or unsaturated lower aliphatic diacid hemiesters or diphenolic ethers with di- or tri-primary diols or triols as vehicles or binders. Polymerization is initiated in these combinations by free-radical generating catalysts.

11 Claims, No Drawings

NON-LEACHABLE U.V. ABSORBER AND DENTAL RESTORATIVE MATERIAL

This invention relates to novel dental compositions in which polymerization is initiated by free-radical generating catalysts which compositions comprise novel combinations of ultraviolet light stabilizers and polymerization accelerators. These compositions show improved stability on storage before use, i.e., shelf-life, as well as better color stability than is attained in the absence of the combination of stabilizer and accelerators.

Dentists are becoming more and more cognizant of the psychological effect of the appearance of teeth, of the mechanical and psychological benefits derived from restorations and of the necessity for providing durable restorations. The most satisfactory generally useful fillings that have been developed are based on the use of combinations of readily polymerizable organic vehicle-binder together with combinations of filters.

It is an aim of this invention to provide improved compositions for dental applications comprising solid inorganic fillers and organic binders comprising monomers containing polymerizable methacrylate groups which are essentially devoid of active-hydrogen containing groups and peroxides, and which compositions have both excellent shelf-life and insignificant color change on aging.

Other objects will become evident from reading the present disclosure.

It has been found that dental filling compositions, particularly those containing poly-1°-carbinol polymethacrylates as vehicle-binders and in which aromatic tertiary amines, such as dimethyl-p-toluidine and N,N-bis(hydroxy-lower-alkyl)-3,5-xylidines, are employed as accelerators for polymerization are enhanced in color stability by using an ultra-violet stabilizers to adduct of glycidyl methacrylate and phenyl salicylate. A valuable feature of this action is that it extends also to aromatic amines some of which may cause unacceptable discoloration in its absence but which offer advantages in other respects. The novel compositions of the invention have excellent storage stability, that is prolonged time of freedom for gelling in the absence of peroxide catalyst and show better color stability than is possessed by compositions containing any of the accelerators in the absence of the stabilizer. Known U.V. stabilizers are generally ineffective.

Usually 0.05 to 5 mole percent of accelerator for the polymerization is dissolved in the binder which is used with about 60–85 percent of filler. A more preferred proportion is about 0.2 to 0.5 weight percent of aromatic tertiary amine. The proportion for the preferred N,N-bis(hydroxy-lower-alkyl)aromatic amines which are generally higher molecular weight accelerators are used in amounts of about 0.2 to 3 percent by weight. In these compounds lower alkyl is generally two to six carbon atoms. It is desirable that the monomers be devoid of any peroxide compounds particularly if a more active accelerator is used. The amounts of accelerator are adjusted so that initial setting is deferred for a few minutes, usually between 2 and 7 minutes after mixing. A treatment with reducing agent prior to use in desirable. If this precaution is not taken shelf-life may be very short.

By the use of phenyl salicylate glycidyl methacrylate adduct as an adjuvant in conjunction with the above aromatic amine accelerators it is found that ultra-violet light stabilization is provided to an enhanced degree, giving even better color stability than is attained even from preferred accelerators, particularly from development of colors during prolonged times of under severely accelerated light testing procedures. Test procedures for dental materials are contained in Guide to Dental Materials, American Dental Association, 2nd and 3rd editions, Chicago, and Proposed Tentative Specification for Composite Resin Filling Materials, September, 1967.

This exceptionally useful stabilizer, which presently appears unique in its properties, is the reaction product of glycidyl methacrylate with phenyl salicylate which has the formula $CH_2=C(CH_3)-CO-O-CH_2-CH(OH)-CH_2-O-C_6H_4-CO-O-C_6H_5$ in which the phenylene group has ortho-substituents. For convenience in notation this compound may sometimes be designated as PS-GMA.

It is found to be a useful stabilizer against exposure to U.V. light for polymerizable materials. It is especially useful in binders for dental purposes and is used in a proportion of from about 0.05 to about 3 percent and preferably 0.2 to 2 percent by weight of the binder. In these amounts the free hydroxyl group which is present appears to be without effect on the water resistance of dental fillings. The stabilizer has the advantage of being copolymerizable with acrylate and methacrylate monomers such as are often empolyed in said binders so that it does not leach out gradually leaving loci in the polymer which may possibly be filled by water. It is especially valuable in and fully compatible with modern polymerizable binders which may include oxirane groups together with acrylate or methacrylate monomers.

The above stabilizer is especially valuable in the instant invention in combination with an accelerator of the type of the N,N-bis(hydroxy-lower-alkyl)-3,5-xylidines, and is generally useful with aromatic amines.

The polycarbinol methacrylate monomers employed as vehicles and binders are of very low volatility and hence have very little odor as compared to compositions including methyl methacrylate, acrylic acid and other such relatively odorous materials which masked the odor of amines, such as dimethyl p-toluidine in some heretofore employed dental composition. The odor of the latter aromatic amine is sufficiently strong as to be objectionable. These binders also possess lower, almost undetectable, toxicities. The instant compositions are preferably made using N,N-bis(hydroxy-lower-alkyl)aromatic amines and are substantially free from odor. The instant compositions include not only a low volatility accelerator but also a copolymerizable and non-leachable stabilizer.

The fillers employed in the compositions of the invention may include small amounts of pigments, either for visual color or fluorescent effect, glassy spherules or particles in small sizes, or crystalline materials such as lithium aluminum silicates, hydroxyapatite, alumina, or aluminiferous and/or silica or siliceous minerals and compositions in various forms, glasses, etc. Particles should be generally smaller than 50 microns and preferably smaller than 30 microns. A commercially available lithium aluminum silicate is used in some examples as an exemplary and generally valuable filler. As obtained particles range from submicron sizes up to 44 $\mu$ with an average of about 2 to 15 microns for lithium aluminum silicate but are higher for other materials, e.g., borosilicate glass up to 85 to 90 microns. Other fillers may be used in somewhat different proportions and may have slightly different properties from the exact figures given. Borosilicate glasses are useful in some instances as well as alpha-quartz, etc. The relation of filler is not critical in the present invention.

It is preferred that the fillers be treated to promote adhesion by the binder, for example, using a conventional vinyl silane treatment or other such pretreatment.

It is found that the most satisfactory workable consistency for dental filling compositions is obtained when fillers having particle sizes in the average range of about 2 to 15 microns are milled with organic binder containing about 0.5 to 2 weight percent of tertiary amine accelerator, that is, N,N-bis(hydroxy-lower-alkyl)-3,5-xylidine, in proportions of about 60 to about 85 percent by weight of filler and 40 to 15 percent of binder and accelerator together. The preferred range is 65 to 80 percent of filler. In both cases the lower percentages are used with more viscous binders. The exact proportions may be varied depending on individual preferences, temperature requirements, etc.

Mixing of binder and filler may be any convenient method and desirably with as little occlusion of air bubbles as possible. Milling or kneading by generally available procedures provides adequate blending. Ball-milling may be less desirable when a spherular filler is included. For convenience in dispensing to dentists two part systems are preferred. These may be two pastes, paste and liquid or a liquid and solid. Catalyst is then included in one part and accelerator in the other. It is also desirable to minimize inclusion of air during spatulation with catalyst before actually placing the polymerizing compositions in dental cavities. Packages or kits may be provided with separate pockets or packages containing predetermined proportions of reactive materials which can be mixed manually or mechanically immediately before use. The amounts of the two reactive materials in paste form may also be measured out by the operator or dentist before mixing.

It is not necessary that polycarbinol polymethacrylates be limited to those in which there is one dibasic acid residue. A bisphenol may also be the equivalent of a dibasic acid residue in some instances. The polycarbinol methacrylates may include dibasic acid or diphenolic residues or larger polyester chains in which one or more diol residues are interposed between dibasic acid or diphenolic residues and terminal methacrylate groups up to the point where the viscosity is not over about 10,000 centipoises. A low concentration of methacrylate groups (milliequivalents per gram of ester) is advantageous in decreasing shrinkage on polymerization although somewhat adversely affecting compressive strength. In general, therefore, the polyester methacrylate esters preferably do not have a very low molecular weight, i.e., 400 or more and upwards as compared to 100 for methyl methacrylate.

The polycarbinol polymethacrylate may be obtained by reaction of any type of intermediate, for example, a di- to trichloromethylated diphenyl ether may be converted to a polycarbinol polymethacrylate:

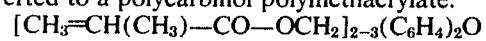

in which substituents are at least in the 4 and 4' positions and may include further substituents in a 2 position. The simple compound may be named 4,4'-bis(methacryloxymethyl)diphenyl ether.

Alkylene oxides and lower chlorohydrins may be reacted with bisphenols such as Bisphenol A, Bisphenol B: $(HOC_6H_4)_2C(CH_3)(C_2H_5)$, Bisphenol F: $(HOC_6H_4)_2CH_2$, Bisphenol: $HOC_6H_4C_6H_4OH$, and also 1,1-bis(p-hydroxyphenyl)cyclohexane $(HOC_6H_4)_2C_6H_4$, 2,2-bis(4-hydroxyphenyl)hexafluoropropane $(HOC_6H_4)_2C(CF_3)_2$, 1,1-bis(4-hydroxyphenyl)ethane $(HOC_6H_4)_2CHCH_3$, etc. Substituents which may be present do not contain active hydrogen atoms. The preferred combinations are obtained from ethylene oxide or chlorohydrin or bisphenol A and particularly from both. In some of these compounds secondary or tertiary hydroxyls are present which may require extra attention to esterify or otherwise block.

A diol alone or with a triol may be partially reacted with a diacid and the residual carbinol groups then esterified by methacrylic acid or the diol and triol may be reacted separately. The resulting products are polyester methacrylate esters and are presently preferred as binders. If it is desired to be assured of freedom from unesterified hydroxyl groups and hence of active hydrogen atoms all hydroxyl groups in diols and triols must be present in primary carbinol groups —$CH_2OH$ or extra precautions for esterification must be observed.

Crystalline polyester methacrylates are generally avoided. For example, the dimethacrylate of isophthalic acid bisdiethylene glycol hemiester tends to crystallize and it is preferable to include some terephthalic acid in the reaction. The corresponding orthophthalate is fluid and is quite satisfactory. The preparation of the latter is known from British Pat. No. 595,881 and also from the review article in Sovient Plastics vol. 12, page 9 (1965) by Berlin et al. Modification is also possible by inclusion of more than one species of glycol, for example, a small amount of ethylene glycol together with diethylene glycol, or inclusion of up to about 50 mole percent of a lower triol.

The polyester methacrylate esters which are particularly useful in dental restorative compositions are represented by the general formula

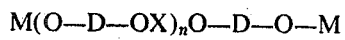

wherein M is methacrylate, D is alkylene of two to eight carbon, bismethylene-cycloalkylene or 3-oxapentylene, $n$ is 1 to 2 and X is the residue of a diacid mono- or binuclear aromatic dicarboxylic acids of eight to 19 carbon atoms, a diphenol of at least two aromatic rings and of from 12–24 carbon atoms or unsaturated dibasic aliphatic acids of up to five carbon atoms. Some exemplary acids are phthalic, isophthalic, terephthalic, fumaric, itaconic, benzophenone-dicarboxylic, resorcinol diacetic, bisphenol A diacetic acid. Diphenols include Bisphenol A, B, F and the like. Substituents which are present in the esters do not contain active hydrogen atoms. These polyester methacrylate esters are relatively non-volatile and substantially odorless and have the further advantage of being of relatively low toxicity as demonstrated by tests in rabbits' eyes. They are therefore less likely to cause irritation of the pulp or nerve of a tooth. The preparation and general characteristics of those derived from dibasic acids are more fully described in application Ser. No. 713,318. Certain exemplary binders which can be incorporated in dental compositions as described below are shown in the following table together with some of the characteristic features. It will be recognized that the corresponding acrylates may be used in greater or less amounts in many instances.

Table

| | Dimethacrylates | | | | |
|---|---|---|---|---|---|
| | Polycarbinol nucleus | | Brookfield Viscosity | $\alpha, \beta$ unsat. | $H_2O$ Absorption not filled 3600 hours |
| Example | Acid | Glycol | cps. | meq/g. | 37°C. in % |
| 1 | Phthalic | Ethylene glycol | 450 | 6.0 | — |
| 2 | Fumaric | Diethylene glycol | 80 | 6.88 | 1.94 |
| 3 | Phthalic | 1,4-Butanediol | 220 | 4.57 | — |
| 4 | 2,4'Benzophenone dicarboxylic | Diethylene glycol | 250 | 5.05 | 1.89 |
| 5 | Itaconic | Diethylene glycol | 54 | 6.90 | 2.87 |
| 6 | Isophthalic* | Diethylene glycol | 240 | — | — |
| 7 | Isophthalic | Diethylene glycol; 1,1,1-trimethylolpropane | 5400 | — | — |
| 8 | Phthalic | Diethylene glycol | 156 | 4.40 | 1.87 |
| 9 | Phthalic | Diethylene glycol | 1940 | 2.61 | 0.81 |
| 10 | Phthalic | Cyclohexane-1,4-dimethanol; 1,6-hexanediol | 486 | 3.57 | — |
| 11 | Phthalic | Cyclohexane-1,4- | 9120 | — | — |
| 12 | Phthalic | 1,6-Hexanediol | 160 | 3.96 | — |
| 13 | Bisphenol A diacetic | Diethylene glycol | 3920 | 3.43 | — |
| 14 | Itaconic | Cyclohexane-1,4-dimethanol | 900 | — | 3.34 |
| 15 | Resorcinol diacetic | 1,6-Hexanediol | 250 | — | — |
| 16 | 4,4'-Dimethylol | diphenyl ether** | 540 | 5.9 | 1.53*** |
| 17 | Bisphenol A | Ethylene glycol | 1600 | 4.0 | 0.63*** |

*A few percent of terephthalic acid effectively suppresses crystallinity.
**Including some of the 2,4,4'-trimethyl trimethacrylate;
***$H_2O$ absorption for 3144 hours at 60° C.

It may be desirable to use two or even more different glycols or to combine esters of two or more different glycols. This assists in decreasing crystallinity. In such cases all of the D's in a molecule will not be identical.

The viscosity of esters may be increased by employing from a few percent up to 50 mole percent or more of a low molecular weight triprimary triol, such as trimethylolpropane and esterifying all hydroxyl groups by forcing the reaction if necessary. Structural formulae of mixed polyesters including such triol nuclei are very difficult to demonstrate but, where T is the nucleus of a triprimary triol, the structure in certain cases may be [M(O—D—O—)$_n$X—O—D—O—]$_3$T where X, D, M and n have the above meanings. Several variations are possible depending on the sequence of reactions.

It will be recognized that the methods of preparation which do not form part of this invention are expected to provide materials of the stated structure but that other materials may be formed at the same time which may also contribute to the usefulness of these materials. For example, molecules in which n is 1 and 2 may be formed in one reaction giving a useful mixture in which n averages between 1 and 2.

A general procedure for successive preparation of glycol hemiethers of bisphenols followed by esterification with methacrylic acid is to condense with an alkylene oxide and then esterify using acid catalysts. The procedure need not be outlined in detail because it is known in the art and has been carried out commercially. It is exemplified below for the bismethacrylate of 2,2-bis-(4-hydroxyethoxyphenyl)propane which has also been available commercially.

Broadly the alkylene oxide, e.g., ethylene oxide, is condensed with the bisphenol, e.g., 2,2-bis(4-hydroxyphenyl)-propane, suitably in the presence of triethyl-amine at about 150° C. The hemiether in this illustrative instance is isolated as a crystalline solid from methanol melting about 110°–112° C. Alternative procedures for preparing hemiethers include reaction of sodium or potassium salts of the diphenol and an hydroxyalkyl bromide or chloride, e.g., 4-bromobutanol, 2-chloroethanol, etc.

The hemiether is esterified. Suitably, a crude reaction mixture may be used without isolation by adding a polymerization inhibitor, such as cuprous chloride, and p-toluene sulfonic acid as catalyst with the appropriate amount of methacrylic acid. Other methods of esterification include reaction with methacrylyl chloride or transesterification with methyl methacrylate.

Above procedures are used with ethylene oxide, 1,2-propylene oxide and 1,2-butylene oxide and with 2,2-bis(4-hydroxyphenyl)propane, 2,2-bis(4-hydroxyphenyl)butane, bis(4-hydroxyphenyl)methane, 2,2-bis(4-hydroxyphenyl)hexafluoropropane and biphenol to give the several hemiethers and the methacrylates thereof. Acrylates are also prepared using acrylic acid or acrylyl chloride.

Because of its ready availability the presently preferred composition is:

This may sometimes be known as ethoxylated bisphenol A bismethacrylate or as the bismethacrylate of the bis-ethylene glycol hemiether of bisphenol A or by other equivalent names.

EXAMPLE 1

4,4'-Di(2-hydroxyethoxy)bisphenol A

A 1 l. three-necked round bottom flask equipped with a paddle stirrer, thermometer, gas inlet adaptor and dry-ice finger condenser, is charged with 342.0 parts (1.50 mole) of bisphenol A. The system is flushed with nitrogen and 2.5 parts by volume of triethylamine are introduced. The reaction mixture is heated to 155° C. at which temperature the charge is molten. Ethylene oxide (145 parts, 3.3 mole) is then introduced continuously, as a gas, through a flow meter at approximately 600 ml. per minute. This addition rate is sufficient to maintain the reaction temperature at 155°-160° C. over almost the entire addition period without the use of supplemental heat and without any significant refluxing of the ethylene oxide. The addition requires 2 hours. The mixture is allowed to cool to 110° C. at which point residual ethylene oxide is flushed out with nitrogen and 0.50 parts (0.013 mole) sodium borohydride introduced. After stirring 15 minutes the almost colorless solution is at 80° C. Methanol (950 parts by volume) is added and the solution cooled and allowed to crystallize. After filtration and drying 349 parts of white crystalline product are obtained, m.p. about 108°-111° C.

4,4'-Di(2-methacryloxyethoxy)bisphenol A. A 500 ml., three-necked, round bottom flask equipped with magnetic stirrer, thermometer, Barrett trap and condenser and air inlet is charged with 158.2 parts (0.500 mole) of 4,4'-di(2-hydroxyethoxy)bisphenol A, 94.6 parts (1.10 mole) of methacrylic acid, 0.25 parts (0.1%) of cuprous chloride, 7.6 parts (3%) of p-toluene sulfonic acid and 50 parts by volume of toluene. A slow stream of air is passed into the system as the mixture refluxes rapidly and water is removed. After 2 hours 1.1 mole of water has been collected and the mixture is cooled to room temperature. The product is diluted with 250 parts by volume of toluene, washed four times with 100 parts by volume of concentrated ammonium hydroxide and three times with simular portions of saturated sodium chloride. The toluene is removed at 60° C. with an air stream leaving 206.7 parts of light amber resinous ethoxylated bisphenol A bismethacrylate having hydroxyl content of 0.215 meq/g., $\alpha, \beta$-unsaturation of 4.04 meq/g. and Brookfield viscosity of 2,000 cps.

EXAMPLE 2

Preparation of Adduct of Glycidyl Methacrylate and Phenyl Salicylate

In a suitable vessel 318 g. (1.5 moles) phenyl salicylate, 113.4 g. (0.83 mole) of glycidyl methacrylate and 4.31 g. of dimethyl-p-toluidine are heated together with constant stirring at 60° C. for 143 hours (6 days). The reaction mixture is cooled and filtered to remove unreacted phenyl salicylate which crystallizes. The filtrate is taken up in ether and washed repeatedly with 0.1 percent aqueous sodium hydroxide until the aqueous layer is colorless. The ethereal solution is then washed with distilled water, dried over anhydrous calcium sulfate, filtered and evaporated at 60° C. under reduced pressure to give a residue comprising phenyl 2-(3'-methacryloxy-2'-hydroxypropoxy) benzoate having the above formula. There is residual unsaturation and oxirane oxygen indicating incomplete reaction. A small amount (250 parts per million) of hydroquinone monomethyl ether is added as a stabilizer.

In another preparation, 321 g. (1.5 moles) phenyl salicylate and 224.6 g. (1.65 moles) of glycidyl methacrylate are heated in a flask to 80° C. with mechanical agitation and 1.38 g. (25.6 meq.) of sodium methoxide are added and heating and agitation are maintained under conditions preventing evaporation of the ester. The oxirane content is followed at intervals by titration and decreases from 2.77 milliequivalents per gram after 5 hours to about 0.038 meg./g. after 48 hours. The material consists essentially of the phenyl 2-(3'-methacryloxy-2'-hydroxypropoxy) benzoate of the invention as a yellowish viscous oil which may be used directly.

EXAMPLE 3

Two batches of the adduct of 2.2 moles of glycidyl methacrylate and 1 mole of bisphenol A are prepared by heating together for about 48 hours. One batch contains 0.303 milliequivalents per gram of oxirane oxygen and 3.5 milliequivalents per gram of unsaturation and for the other the corresponding figures are 0.307 and 3.64 respectively.

Dental filling compositions are prepared from these two polymerizable binder compositions for test samples so that they include dimethyl-p-toluidine and dimethyl-3,5-xylidine as tertiary amine accelerators and additionally contain 2 percent by weight of the phenyl salicylate and glycidyl methacrylate adduct of Example 2.

Each is mixed with two different fillers one of which is essentially glass spherules (constituting 74 percent of the total composition) and the other of which is essentially finely powdered synthetic lithium aluminum silicate (constituting 76 percent of the composition). Controls not containing the adduct of Example 2 are also prepared. Portions of each of the filled compositions are polymerized and exposed to ultra-violet light in accordance with the test developed for denture base resins, American Dental Association Specification No. 12 paragraph 4.3.6 in Guide to Dental Materials, 2nd edition, 1964, Chicago, Ill., and compared with unexposed portions. In each case the samples containing none of the adduct of phenyl salicylate and glycidyl methacrylate are quite noticeably yellow and discolored and are considered to fail the test whereas the samples containing the adduct are no more than barely preceptibly changed in color and are considered to pass the test.

EXAMPLE 4

A valuable class of monomers for use as binders in dental filling compositions, exemplified by diethylene glycol phthalate bismethacrylate, is the class or aromatic or unsaturated lower aliphatic diacid bis hemiesters of primary diols or triols terminally fully esterified with acrylyl or methacrylyl groups. This class is important because of water resistance and low odor as compared with certain earlier used monomers. These binders are advantageously used with special additives which are complementary in properties. Thus, the accelerator which is used is of the low odor and relatively non-volatile type. An example of such an accelerator is N,N-bis(2-hydroxyethyl)-3,5-xylidine. These more complex systems suffer from some color instability on exposure to ultra-violet light which is overcome by using phenyl salicylate glycidyl methacrylate adduct as shown in the following example.

A series of dental filling compositions are prepared using the bis methacrylate of diethyleneglycol (phthalate) as binder with different included accelerators, antioxidants and the ultra-violet absorbing color protectant PS-GMA. The binder is combined with synthetic lithium aluminum silicate in the proportion of 24:76 and polymerized and exposed to ultra-violet light as in Example 3 above.

A. Binder contains 100 parts per million of hydroquinone monomethyl ether and 0.5 percent dimethyl-p-toluidine. A severe discoloration occurs in the test.
B. Binder contains 0.75 percent of N,N-bis-(2-hydroxyethyl)-3,5-xylidine. Discolors so as not to pass test.
C. Binder contains 0.75 percent of N,N-bis-(2-hydroxyethyl)-3,5-xylidine and 2.0 percent of above PS-GMA of Example 2. Discoloration just barely discernable and passes test.
D. Binder as in C additionally containing 0.005 percent of a yellowish pigment to assist in matching tooth color. Discoloration entirely masked by inherent color and the combination passes test.

EXAMPLE 5

A stable two part dental composition of the invention is prepared from the above ethoxylated bisphenol A bis methacrylate to which are added 0.75 percent by weight of N,N-bis(2-hydroxyethyl)-3,5-xylidine and 1.0 percent of the adduct of glycidyl methacrylate and phenyl salicylate of Example 2. This honey-like liquid is mixed in a proportion of 28 percent by weight with 72 percent of a powdered lithium aluminum silicate (calcined petalite), treated with vinyl silane and in which is absorbed about 0.5 percent of its weight of benzol peroxide and cast into test samples for use in American Dental Association tests. Water absorption after 500 hours is only 0.3 percent by weight. Polymerization shrinkage is 0.9 percent as compared to about 7 percent for methyl methacrylate systems. The compressive strength is 36,200 pounds per square inch and tensile strength by diametral tests 6000 pounds per square inch.

EXAMPLE 6

Samples of bis(2-hydroxyethyl)bisphenol A bismethacrylate are prepared for (A) and (C) of Example 4 except that only 1 percent by weight of the phenyl salicylate glycidyl methacrylate adduct is used for the latter sample. These are polymerized and tested as in earlier examples. The latter containing the combination is clearly less discolored.

EXAMPLE 7

Dental filling compositions are prepared using as the inert inorganic filler pigmented siliceous materials. An example is a finely divided powdered borosilicate glass (preferably below 50 micron size) which is intimately mixed with about 0.1 percent of fluorescent pigment, about 0.01 percent of raw sienna and a few thousandths percent of very finely divided black and yellow pigments. The powdered glass has particles up to 85–90 microns but is mostly 4–50 microns. (95% > 4.1 $\mu$; 5% > 50.9 $\mu$) This combination of filler and pigments is found to approximate normal tooth color in many cases and can be further colored when necessary. It is desirable to apply a treatment to this filler to promote wetting by resins. Silane treatments as with 3-methacryloxypropyl trimethoxy silane is appropriate.

One method for dispensing materials for dental fillings is as a two part system of liquid and solid components which are combined either from separate containers or are intermingled by rupture of a seal intervening between predetermined amounts. The dry component is formed from 69.65 parts of the above inorganic filler (including pigments) thoroughly mixed with 0.35 part of benzoyl peroxide. The resultant mixture is a dry powder. The liquid composition is made from 29.50 parts of the bis methacrylate of 2,2-bis(p-hydroxyethoxyphenyl)propane:

containing about 0.01 percent of methyl hydroquinone as inhibitor.

An adduct is made from phenyl salicylate (318 parts, 1.5 moles) with glycidyl methacrylate (113 parts, 0.83 moles) and about 4.3 parts of dimethyl-p-toluidine by heating at 60° C. for about 6 days followed by removal of unreacted salicylate first by crystallization then by mild alkaline washes.

The bismethacrylate resin is thoroughly mixed with 0.29 part of the above phenyl salicylate adduct with glycidyl methacrylate and 0.21 part of N,N-bis(2-hydroxyethyl)-3,5-xylidine. Aliquots in these weight proportions (70:30) suitably totalling about 0.5–2.0 grams, are placed in different parts of a package having a rupturable membrane. Mixing is effected by rupturing the membrane and kneading the solid and liquid together. This is done rapidly and the paste is used for filling previously prepared cavities in teeth. It sets rapidly to a sound filling.

An alternative procedure is to prepare two pastes which are mixed mechanically or by spatulation in equal amounts. The pastes may be prepared to have viscosities in the range of 100–8,000 centipoises and preferably about 1,000 to 4,000 centipoises.

One paste is made containing 72 parts of the above siliceous filler with 27.27 parts of the above resin, 0.28 parts of the adduct of phenyl salicylate and glycidyl methacrylate and 0.45 parts of N,N-bis(2-hydroxyethyl-3-p-toluidine. The second paste contains 25.58 parts of resin, 74 parts of siliceous filler 0.42 part of benzoyl peroxide and a trace (500 parts per million, 0.05 percent) of commercial butylated hydroxy toluene as an inhibitor. Equal portions of the two pastes are packaged, for example, in tubes and small amounts are dispensed and mixed as required. The resultant composition is effective for filling cavities.

What is claimed is:

1. A dental restorative composition polymerizable by free radical catalysis having improved color stability comprising of 60–85 percent by weight of glassy or crystalline non-metallic inorganic particulate filler and 40–15 percent of a liquid ethylenically unsaturated polymerizable binder capable of undergoing free radical polymerization and containing the combination of from about 0.05 to 2 weight percent of mononuclear tertiary aromatic amine accelerator and 0.05 to about 3 weight percent of copolymerizable U.V.-absorbing reaction product of phenyl salicylate and glycidyl methacrylate.

2. The composition of claim 1 wherein the tertiary amine is N,N-bis(hydroxy-lower-alkyl)aromatic amine.

3. The composition of claim 1 wherein the tertiary amine is dimethyl-p-toluidine.

4. Composition according to claim 1 wherein the polymerizable binder is polycarbinol polymethacrylate or polyacrylate.

5. Composition according to claim 4 wherein the polymerizable binder is bismethacrylate of bishemiglycol ether of diphenolic aromatic compound.

6. Composition according to claim 5 wherein the polymerizable binder is bismethacrylate of 2,2-bis(p-hydroxyethoxyphenyl)propane.

7. Composition according to claim 4 wherein the particulate filler comprises a member of the group consisting of lithium aluminum silicate, quartz or borosilicate glass.

8. Composition according to claim 7 wherein the binder is bismethacrylate of bishemiglycol ether of diphenolic aromatic compound.

9. Composition according to claim 8 wherein the polymerizable binder is bismethacrylate of 2,2-bis(p-hydroxyethoxyphenyl)propane.

10. Composition according to claim 9 wherein the accelerator is N,N-bis(2-hydroxyethyl)-p-toluidine.

11. Composition according to claim 9 wherein the accelerator is N,N-bis(2-hydroxyethyl)-3,5-xylidine.

* * * * *

UNITED STATES PATENT OFFICE
CERTIFICATE OF CORRECTION

Patent No. 3,819,568                     Dated June 25, 1974

Inventor(s) Charles W. Taylor and Robert W. H. Chang

It is certified that error appears in the above-identified patent and that said Letters Patent are hereby corrected as shown below:

Column 1, line 37, "an" should read -- as --.
Column 1, line 37, "to" should read -- the --.
Column 1, line 44, "for" should read -- from --.
Column 2, line 30, "empolyed" should read -- employed --.
Column 5, Example 11, "Cyclohexane-1,4-" should read
-- Cyclohexane-1,4-dimethanol --.

Signed and sealed this 18th day of February 1975.

(SEAL)
Attest:

RUTH C. MASON
Attesting Officer

C. MARSHALL DANN
Commissioner of Patents
and Trademarks